(12) United States Patent
Mattsson et al.

(10) Patent No.: US 11,962,699 B2
(45) Date of Patent: Apr. 16, 2024

(54) PARALLEL TOKENIZATION OF DECIMAL INFORMATION IN A DISTRIBUTED NETWORK ENVIRONMENT

(71) Applicant: Protegrity Corporation, Grand Cayman (KY)

(72) Inventors: Ulf Mattsson, Cos County, CT (US); Denis Scherbakov, Munich (DE)

(73) Assignee: PROTEGRITY CORPORATION, Grand Cayman (KY)

( * ) Notice: Subject to any disclaimer, the term of this patent is extended or adjusted under 35 U.S.C. 154(b) by 287 days.

(21) Appl. No.: 17/581,069

(22) Filed: Jan. 21, 2022

(65) Prior Publication Data
US 2022/0247563 A1 Aug. 4, 2022

Related U.S. Application Data

(60) Provisional application No. 63/144,209, filed on Feb. 1, 2021.

(51) Int. Cl.
*H04L 9/32* (2006.01)
*G06F 21/60* (2013.01)
*H04L 9/06* (2006.01)
*H04L 67/1097* (2022.01)

(52) U.S. Cl.
CPC ............ *H04L 9/3213* (2013.01); *G06F 21/60* (2013.01); *H04L 9/0618* (2013.01); *H04L 9/3236* (2013.01); *H04L 67/1097* (2013.01)

(58) Field of Classification Search
CPC ...................................................... H04L 9/3213
See application file for complete search history.

(56) References Cited

U.S. PATENT DOCUMENTS

| | | | | |
|---|---|---|---|---|
| 5,347,632 | A | * | 9/1994 | Filepp .................... H04L 67/34 709/202 |
| 8,359,326 | B1 | | 1/2013 | Garg et al. |
| 9,081,978 | B1 | | 7/2015 | Connolly et al. |

(Continued)

OTHER PUBLICATIONS

International Search Report and Written Opinion, Patent Cooperation Treaty Application No. PCT/US2022/014171, dated Apr. 27, 2022, 29 pages.

(Continued)

*Primary Examiner* — Simon P Kanaan
(74) *Attorney, Agent, or Firm* — Fenwick & West LLP

(57) ABSTRACT

Data in various formats can be protected in a distributed tokenization environment. Examples of such formats include date and time data, decimal data, and floating point data. Such data can tokenized by a security device that instantiates a number of tokenization pipelines for parallel tokenization of the data. Characteristics of such data can be used to tokenize the data. For instance, token tables specific to the data format can be used to tokenized the data. Likewise, a type, order, or configuration of the operations within each tokenization pipeline can be selected based on the data format or characteristics of the data format. Each tokenization pipeline performs a set of encoding or tokenization operations in parallel and based at least in part on a value received from another tokenization pipeline. The tokenization pipeline outputs are combined, producing tokenized data, which can be provided to a remote system for storage or processing.

20 Claims, 11 Drawing Sheets

(56) References Cited

U.S. PATENT DOCUMENTS

| | | | |
|---|---|---|---|
| 9,237,006 | B2 | 1/2016 | Mattsson et al. |
| 9,442,980 | B1 * | 9/2016 | Trepetin .............. G06F 16/2455 |
| 9,973,475 | B2 | 5/2018 | Jain et al. |
| 10,108,605 | B1 | 10/2018 | Leighton |
| 2002/0046201 | A1 | 4/2002 | Hembry |
| 2004/0044878 | A1 | 3/2004 | Evans et al. |
| 2011/0154467 | A1 | 6/2011 | Bomar et al. |
| 2013/0007077 | A1 | 1/2013 | Wegener |
| 2013/0007078 | A1 | 1/2013 | Wegener |
| 2013/0060827 | A1 | 3/2013 | Wegener |
| 2013/0091143 | A1 | 4/2013 | Raemy et al. |
| 2013/0103685 | A1 | 4/2013 | Preneel et al. |
| 2014/0208068 | A1 | 7/2014 | Wegener |
| 2016/0299882 | A1 | 10/2016 | Hegerty et al. |
| 2017/0053138 | A1 | 2/2017 | Rozenberg et al. |
| 2017/0063533 | A1 | 3/2017 | Barham et al. |
| 2019/0158288 | A1 | 5/2019 | Williamson et al. |
| 2020/0250338 | A1 * | 8/2020 | McFall .................. G06F 21/16 |
| 2021/0019309 | A1 | 1/2021 | Yadav et al. |

OTHER PUBLICATIONS

Srikanth, "Parallel lexical analyzer on the cell processor," 2010 Fourth International Conference on Secure Software Integration and Reliability Improvement Companion, IEEE, 2010, Jun. 11, 2010, pp. 28-29, Retrieved on Apr. 2, 2022 from <https://ieeexplore.ieee.org/abstract/document/5521554>.

Tan et al., "Mind your Inflections! Improving NLP for non-standard Englishes with Base-Inflection Encoding," arXiv preprint arXiv:2004.14870 (2020), Nov. 18, 2020, 17 pages, Retrieved on Apr. 2, 2022 from <https://arxiv.org/pdf/2004.14870.pdf>.

United States Office Action, U.S. Appl. No. 17/492,591, Nov. 2, 2023, 22 pages.

United States Office Action, U.S. Appl. No. 17/581,070, Jan. 12, 2024, 25 pages.

United States Office Action, U.S. Appl. No. 17/581,068, Jan. 24, 2024, 95 pages.

* cited by examiner

| Input character 305 | UTF-8 code value 310 | Token Column 315 | Token Column 320 | Token Column 325 |
|---|---|---|---|---|
| a | 0061 | E29E | 5055 | 782B |
| b | 0062 | 72A1 | 4CEF | 2441 |
| c | 0063 | B800 | A2C4 | A326 |
| ... | ... | ... | ... | ... |
| श | 0A08 | 8814 | 0BB8 | 26D2 |
| ß | 0A09 | 9C36 | 502D | 904F |
| ऋ | 0A10 | BEB1 | DE31 | 0C3E |
| ... | ... | ... | ... | ... |
| ⓙ | A2B6 | 0761 | 17A3 | FF01 |
| ⓚ | A2B7 | B82E | 46EA | 8B3F |
| ⓛ | A2B8 | A194 | 4AB9 | 257A |
| ... | ... | ... | ... | ... |

PARALLEL TOKENIZATION OF DECIMAL INFORMATION IN A DISTRIBUTED NETWORK ENVIRONMENT

CROSS REFERENCE TO RELATED APPLICATIONS

The application claims the benefit of Provisional Application No. 63/144,209, filed on Feb. 1, 2021, the contents of which are incorporated herein by reference.

FIELD OF ART

This application relates generally to the field of data protection, and more specifically to the tokenization of data in a distributed network environment.

BACKGROUND

Various formats of data have different characteristics and properties that enable the formats to represent different types of information. For instance, date information can be represented in a "YYYY-MM-DD" format, where "YYYY" represents the four-digit year, where "MM" represents the two-digit month, and where "DD" represents the two-digit day. Likewise, decimal information can be represented in a "ABCDE.FGHIJ" format, where "ABCDE" represents a five-digit whole number, and where "FGHIJ" represents a five-digit decimal portion of the number. Finally, floating point information can be represented to a "ABCDE×10$^{FGH}$" format, where "ABCDE" represents a five digit significand, where "10" represents a two digit base, and where "FGH" represents a three digit exponent. Accordingly, there is a need to protect information in these formats that accounts for the structure and characteristics of these formats.

BRIEF DESCRIPTION OF DRAWINGS

FIG. 3 illustrates an example Unicode token table, according to one embodiment.

Figure 1:
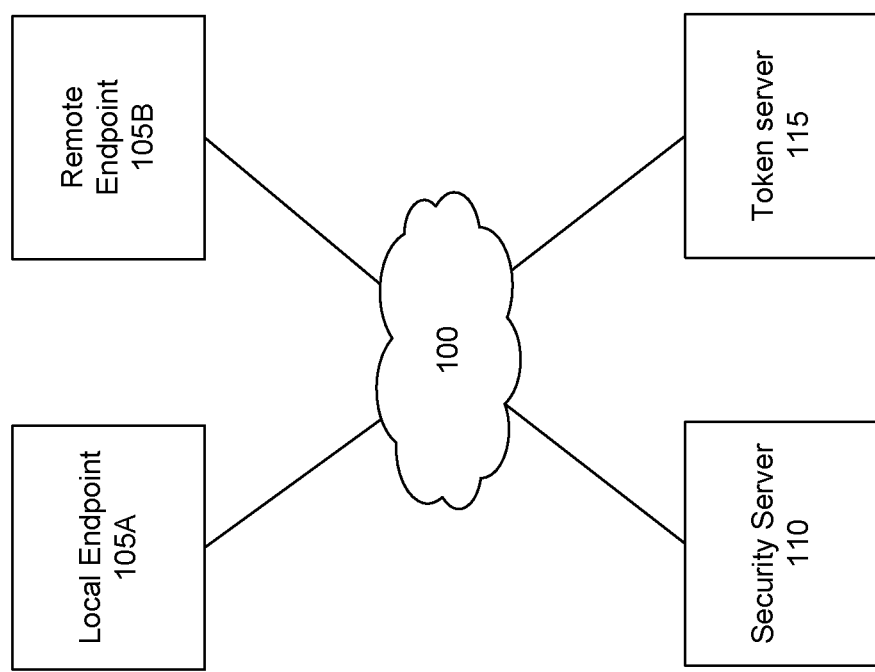
FIG. 1 illustrates an example distributed tokenization environment, according to one embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

Tokenization Overview

As used herein, the tokenization of data refers to the generation of tokenized data by querying one or more token tables mapping input values to tokens with one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or format-preserving encryption), a one-way non-reversible cryptographic function (e.g., a hash function with strong, secret salt), or a similar encryption before or after the tokenization of the sensitive data. Any suitable type of encryption can be used in the tokenization of data.

As used herein, the term token refers to a string of characters mapped to an input string of characters in a token table, used as a substitute for the input string of characters in the creation of tokenized data. A token may have the same number of characters as the string being replaced, or can have a different number of characters. Further, the token may have characters of the same type or character domain (such as numeric, symbolic, or alphanumeric characters) as the string of characters being replaced or characters of a different type or character domain. Tokens can be randomly generated and assigned to a particular token table input value.

Any type of tokenization may be used to perform the functionalities described herein. One such type of tokenization is static lookup table ("SLT") tokenization. SLT tokenization maps each possible input value (e.g., possible character combinations of a string of characters, possible input values, etc.) to a particular token. An SLT includes a first column comprising permutations of input string values, and may include every possible input string value. The second column of an SLT includes tokens ("token values"), with each associated with an input string value of the first column. Each token in the second column may be unique among the tokens in the second column. Optionally, the SLT may also include one or several additional columns with additional tokens mapped to the input string values of the first column. In some embodiments, each combination of an input column (the "first" column) and a token column (a column with tokens mapped to input string values) may be considered a distinct token table, despite being co-located within a same table. A seed value can be used to generate an SLT, for instance by generating random numbers based on the seed value for each token in the SLT.

An SLT can be shuffled using a shuffle operation to create a new SLT, for instance by re-ordering the tokens mapped to the input values. The tokens can be re-ordered when shuffling an SLT based on a seed value, such as a randomly generated number value. The seed value can be used to select a token from the tokens of the SLT to map to the first input value, can be used to select a second token from the tokens of the SLT to map to the second input value, etc. For example, the seed value can be used to seed a random number generator which randomly selects token values from the tokens of the SLT for mapping to the input values of the SLT. Likewise, the seed value can be used to modify tokens within the SLT to produce new tokens for the SLT. For instance, the seed value can be used to seed a mathematical function (such as a hash function, modulo addition, multiplication, dot products, and the like) which converts a value of each token to a new value, which are stored within the SLT, replacing the corresponding tokens. Shuffling the values of tokens within a token table produces a shuffled token table, allowing a data storage entity to use a different encoding mechanism (the shuffled token table) without requiring the shuffled token table to be transmitted to the data storage entity (e.g., the shuffled token table can be generated from a token table to which the data storage entity has access). Such embodiments enable the data storage entity to continue to update their security protocols and procedures without requiring the bandwidth associated with transmitting large SLTs and/or without requiring the data storage entity to be communicatively connected to a token server.

In some embodiments, to increase the security of tokenization, sensitive data can be tokenized two or more times using the same or additional token tables. Each successive tokenization is referred to as a "tokenization iteration" herein. For example, the first 4 digits of a Unicode code value can be replaced with a first token value mapped to the first 4 digits by a first token table, digits 2 through 5 of the resulting tokenized Unicode code value can be replaced with a second token value mapped to digits 2 through 5 by a second token table, and so on. Portions of data may be tokenized any number of times, and certain portions of the sensitive data may also be left un-tokenized. Accordingly, certain digits of tokenized data may be tokenized one or more times, and certain digits may not be tokenized.

Dynamic token lookup table ("DLT") tokenization operates similarly to SLT tokenization, but instead of using static tables for multiple tokenization operations, a new token table entry is generated each time sensitive data is tokenized. A seed value can be used to generate each DLT. In some embodiments, the sensitive data or portions of the sensitive data can be used as the seed value. DLTs can in some configurations provide a higher level of security compared to SLT, but can also require the storage and/or transmission of a large amount of data associated with each of the generated token tables. While DLT tokenization can be used to tokenize data according to the principles described herein, the remainder of the description will be limited to instances of SLT tokenization for the purposes of simplicity The security of tokenization can be further increased through the use of initialization vectors ("IVs"). An IV is a string of data used to modify sensitive data prior to or after tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. In some embodiments, IVs can be accessed from other tokenization operations (e.g., the input value used to query a token table or the output, such as a token value or tokenized data, of a token table). As described herein, IVs can be data values accessed from parallel tokenization pipelines. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

As used herein, "tokenization parameters" refers to the properties or characteristics of a tokenization operation. For example, tokenizing data according to tokenization parameters can refer to but is not limited to one or more of the following: the generation of token tables for use in tokenizing the data; the identity of pre-generated token tables for use in tokenizing the data; the type and number of token tables for use in tokenizing the data; the identity of one or more tokens for use in tokenizing the data; the number of tokenization iterations to perform; the type, number, and source of initialization vectors for use in modifying the data prior to tokenization; the portion of sensitive data to be tokenized; and encryption operations to perform on the data before or after tokenization. Tokenization and initialization vectors are described in greater detail in U.S. patent application Ser. No. 13/595,438, titled "Multiple Table Tokenization", filed Aug. 27, 2012, the contents of which are hereby incorporated by reference.

Distributed Tokenization Environment Overview

FIG. 1 illustrates an example distributed tokenization environment, according to one embodiment. The environment of FIG. 1 includes a local endpoint 105A and a remote endpoint 105B, a security server 110, and a token server 115. The entities of FIG. 1 are, include, or are implemented within computing devices and are configured to transmit and receive data through a connecting networking 100. In other embodiments, the tokenization environment illustrated in FIG. 1 can include additional, fewer, or different entities, and the entities illustrated can perform functionalities differently or other than those described herein. For example, in some embodiments the token server 115 is implemented within the security server 110. Further, any number of each type of entity shown in FIG. 1 can be included in various embodiments of a tokenization environment. For example, thousands or millions of endpoints can communicate with one or more security server and/or token server.

The connecting network 100 is typically the Internet, but may be any network, including but not limited to a LAN, a MAN, a WAN, a mobile wired or wireless network, a private network, a virtual private network, a direct communication line, and the like. The connecting network can be a combination of multiple different networks. In addition, the connecting network can be located within any entity illustrated in FIG. 1 in whole or in part, and can include both inner- and inter-entity communication lines.

The local endpoint 105A and the remote endpoint 105B are computing devices, and in some embodiments are mobile devices, such as a mobile phone, a tablet computer, a laptop computer, and the like. An endpoint can also be a traditionally non-mobile entity, such as a desktop computer, a television, an ATM terminal, a ticket dispenser, a retail store payment system, a website, a database, a web server, and the like. Each endpoint includes software configured to allow a user of the endpoint to interact with other entities within the environment of FIG. 1. For example, the endpoint can include a mobile wallet application or other payment application configured to allow a user to use the endpoint to transmit payment information when conducting a transaction, for instance at a store or restaurant. In various embodiments, the local endpoint can generate Unicode data to provide to the remote endpoint, and the data can be first routed to or intercepted by the security server 110 for tokenization, and the security server can tokenize data using a token table received from the token server 115. The tokenized data can then be provided by the security server to the remote endpoint, for instance for storage or processing.

The security server 110 (or "central server") is configured to encode data provided by the local endpoint 105A or the remote endpoint 105B using a tokenization scheme described herein. The security server 110 is described in more detail below. The token server 115 is configured to generate, access, and/or store tokens and token tables, and to provide the tokens and token tables to the security server for use in tokenizing and detokenizing data and generating shuffled token tables. Both the security server and the token server are computing devices configured to perform the functionalities described herein. For example, the security server can receive a token table (such as an SLT) from the token server for use in tokenizing data received from the local endpoint and the remote endpoint.

Parallel Unicode Tokenization in a Distributed Environment

Figure 2:
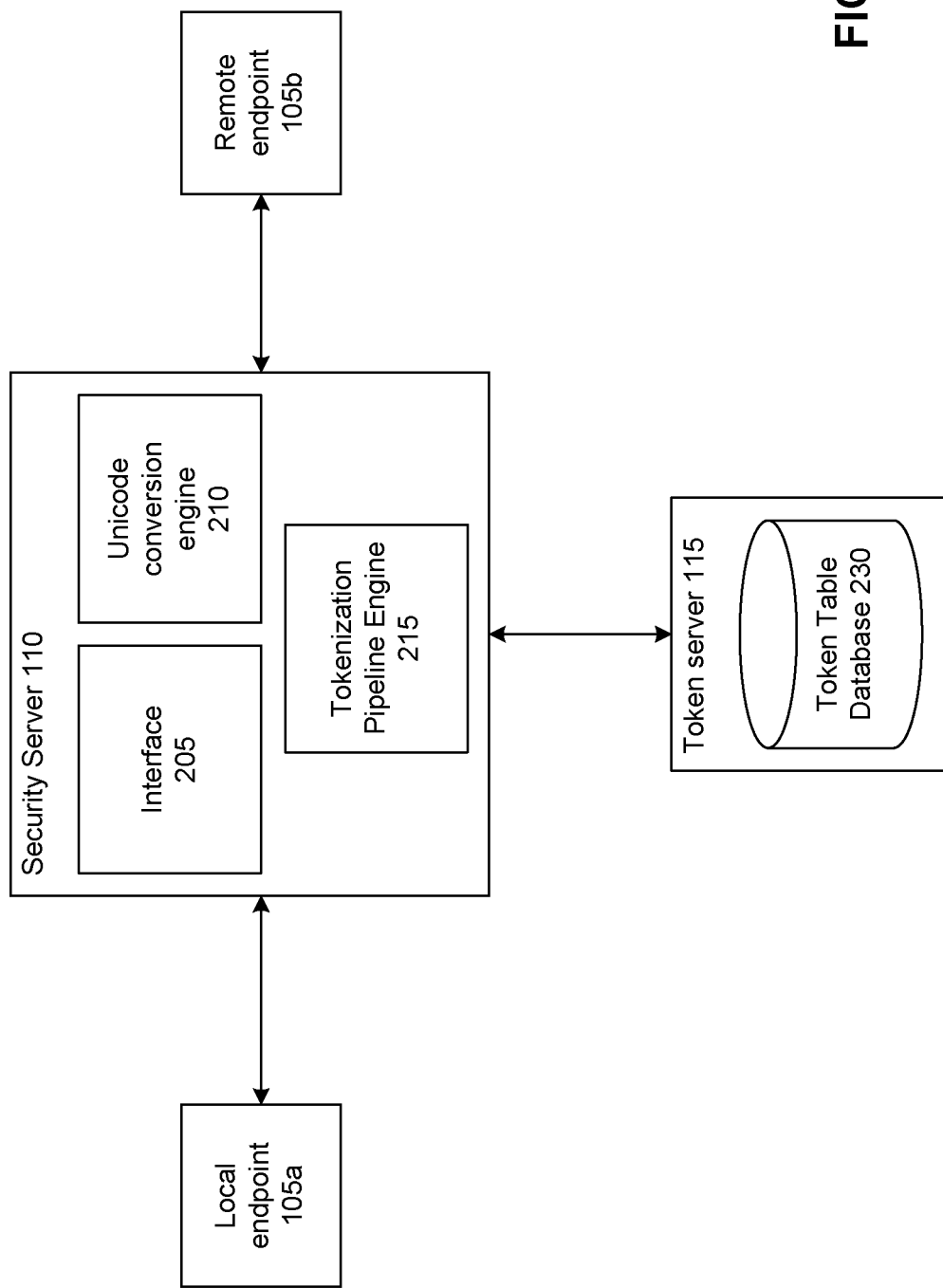
FIG. 2 illustrates dataflow within the distributed tokenization environment of FIG. 1, according to one embodiment.

FIG. 2 illustrates dataflow within the distributed tokenization environment of FIG. 1, according to one embodiment. In the embodiment of FIG. 2, the local endpoint 105*a* provides data for tokenization in a Unicode format to the security server 110. For instance, the data provided to the security server can be communications data (such as an email body, a Word document, etc.), payment data, an HTML request, media data, and the like. In some embodiments, the information provided to the security server includes characters corresponding to one or more human languages, in a Unicode format corresponding to the one or more human languages. For instance, for a string of English characters, the local endpoint can provide the UTF-8 code values corresponding to the string of English characters to the security server. Alternatively, the local endpoint can provide data to the security server in a plaintext or encrypted format.

In one example, the local endpoint 105*a* is a web server that provides the contents of a webpage (e.g., text within the webpage, media files associated with the webpage, and HTML data corresponding to the webpage) in a Unicode format for rendering by the remote endpoint 105*b*. In this example, the security server 110 may be a firewall or gateway server located within the same network as the local endpoint and through which the contents of the webpage are routed. The security server can protect the contents of the webpage, for instance using the parallel tokenization described herein, and can provide the protected contents of the webpage to the remote endpoint for decoding/detokenization and rendering by the remote endpoint.

The security server 110 can access one or more token tables from the token server 115, for instance in advance of or in response to receiving a request for tokenization by the local endpoint 105*a*, or in response to intercepting or receiving data provided by the local endpoint for transmission to the remote endpoint 105*b*. In some embodiments, the security server accesses token tables from the token server periodically, in response to an expiration of token tables previously accessed by the security server, in response to a request from an entity associated with the local endpoint or any other component or system of FIG. 2, or in response to any other suitable criteria. It should be noted that although displayed separately in the embodiment of FIG. 2 (e.g., as separate computing systems that may be geographically remote), in practice, the token server may be implemented within the security server.

The token server 115 can generate token tables to immediately provide to the security server 110 (e.g., in response to a request for token tables from the security server), or for storage in the token table database 230 (e.g., for subsequent providing to the security server). Likewise, the token server can access token tables generated by other entities, and can store these token tables or can provide the token tables to the security server.

One type of token table generated, accessed by, or stored by the token server 115 are Unicode token tables. A Unicode token table maps Unicode code values (eg, the binary, hex, or other format values mapped to characters of the various human languages represented by Unicode) to token values. In some embodiments, the Unicode token tables can map Unicode encodings for any Unicode or similar standard, including but not limited to UTF-8, UTF-16, UTF-32, UTF-2, GB18030, BOCU, SCSU, UTF-7, ISO/IEC 8859, and the like. For the purposes of simplicity, reference will be made to UTF-8 herein, though the principals described herein are applicable to any Unicode or similar standard.

The Unicode token tables described herein can map Unicode encodings in any format to token values. In some embodiments, the token values of the Unicode token tables are mapped to Unicode code values in a hexadecimal format, while in other embodiments, the Unicode code values are in a binary format, a decimal format, or any other suitable format. In some embodiments, the Unicode code values of a token table include code points that correspond to human language characters. In other embodiments, the Unicode code values include a combination of code points and suffixes or prefixes. In some embodiments, the Unicode code values include every potential value for a particular format and code value length. In yet other embodiments, the Unicode code values include every potential code value represented by a Unicode or similar standard, or include Unicode code values corresponding only to a subset of the human languages represented by Unicode.

In one embodiment, token tables generated, accessed, or stored by the token server 115 map Unicode code values in a particular character domain to token values selected from Unicode code values corresponding to the character domain. For instance, a token table that includes Unicode code values corresponding to Kanji can map the Unicode code values to token values selected from a set of values that include the Kanji Unicode code values. In other embodiments, token tables generated, accessed, or stored by the token server map Unicode code values in a first character domain to token values selected from Unicode code values corresponding to a second character domain. For instance, a token table that includes Unicode code values corresponding to Hebrew characters can map the code values to token values selected from a set of values that include English Unicode code values. In some embodiments, the token tables generated, accessed, or stored by the token server map Unicode code values to token values that are randomly generated, and are not limited to a particular set of values.

In one implementation, the security server 110 can receive data to be tokenized from the local endpoint 105*a*. The received data can include only Katakana and Hiragana characters, and the security server can request identify the Katakana and Hiragana languages to the token server 115 in a request for token tables. The token server, in response, can generate Unicode token tables that map token values to Unicode code values for the Katakana and Hiragana character sets. By limiting the character sets included in the requested Unicode token tables, the resulting Unicode token tables are smaller size, decreasing the amount of storage required to store the token tables, decreasing the amount of time required to generate the token tables, and decreasing the amount of time required by the security server to use the token tables to generate tokenized data, thereby improving the performance of one or both of the security server and the token server. It should be noted that in other embodiments, the token server can limit the number of languages represented by generated token tables based on other factors, including an identity of an entity associated with the local endpoint, the remote endpoint 105b, or associated with a request to tokenize data; a geography associated with the local endpoint, the security server, or the remote endpoint; a type of transaction or document associated with a tokenization request; or any other suitable factor.

For example, if a document including information to be tokenized includes English characters, the security server 110 can access Unicode token tables that map token values to Unicode code values corresponding to English characters (and not, for instance, characters of other languages). Likewise, if an entity or individual frequently requests data to be tokenized corresponding to mathematical symbols and Farsi characters, the security server 110 can access Unicode token tables that map token values to these Unicode code values associated with these characters and not the characters of other languages. In another example, if a request to tokenize data is received from a particular jurisdiction associated with one or more languages (for instance, Switzerland, where Swiss and German are frequently spoken), then the security server 110 can access token tables that map token values to the Unicode code values associated with characters of these languages, and not other languages. It should be noted that new token tables can be accessed or generated for each new request to tokenize characters, after a threshold number of requests from a particular entity requesting tokenization, after a passage of a threshold amount of time since token tables were generated or accessed for a particular entity requesting tokenization, or based on any other criteria.

FIG. 3 illustrates an example Unicode token table, according to one embodiment. In the embodiment of FIG. 3, the token table 300 includes a UTF-8 code value column 310, a first token column 315, a second token column 320, and a third token column 325. Although the input character column 305 is shown in FIG. 3, this is merely to illustrate which characters are mapped to the UTF-8 code values included in the UTF-8 code value column, and in practice the Unicode token tables described herein may not include an input character column as illustrated in FIG. 3. In the token table of FIG. 3, the input character "a" corresponds to the UTF-8 code value "0061", and is mapped to the token value "E29E" in the first token column 315, the token value "5055" in the second token column 320, and the token value "782B" in the third token column 325. Likewise, the characters "b", "c", "ही", "ऐ", "अ", "◉", "◎", and "◐" each correspond to UTF-8 code values, and are each mapped to different token values in each of the three token columns.

It should be noted that the token table 300 of FIG. 3 includes Unicode code values for every UTF-8 character, though not all such characters are illustrated in FIG. 3 for the purposes of simplicity. It should also be noted that the token table of FIG. 3 includes three token columns. In practice, the token table of FIG. 3 can be considered three separate token tables, each including the UTF-8 code value column 310 and a different one of the token columns. Thus, a first token table can include the UTF-8 code value column and the first token column 315, a second token table can include the UTF-8 code value column and the second token column 320, and a third token table can include the UTF-8 code value column and the third token column 325. The token tables described herein can include any number of token columns, though must include at least one token column. It should be noted that although each token column of FIG. 3 includes token values in hexadecimal, in practice, the token values can be in any form, and need not mirror the format and character set of the Unicode code values.

The security server 110 can use the Unicode token table 300 of FIG. 3 to tokenize data. For instance, if the security server 110 tokenizes the word "belmont", the security server 110 can break apart the word "belmont" into the component letters "b", "e", "l", "m", "o", "n", and "t", and can tokenize each character, for instance by tokenizing the first three letters using a first set of parallel tokenization pipelines and the last four letters using a second set of parallel tokenization pipelines. In a first tokenization step, the security server can convert the letter "b" into the Unicode code value "0062", and can query the token table of FIG. 3 using the Unicode code value "0062" to identify the token value "72A1" mapped to the Unicode code value "0062" by the first token column 315. To complete the first tokenization step, the security server can replace the Unicode code value "0062" with the token value "72A1" before continuing to a next tokenization step. Tokenization using parallel tokenization pipelines is described in greater detail below.

Returning to FIG. 2, the security server 110 includes an interface 205, a Unicode conversion engine 210, and a tokenization pipeline engine 215 (or simply "pipeline engine" hereinafter). In other embodiments, the security server can include additional, fewer, or different components than those illustrated herein. The security server receives data to be tokenized from the local endpoint 105a, accesses token tables from the token server 115, tokenizes the received data using the accessed token tables, and provide the tokenized data to the remote endpoint 105b.

The interface 205 provides a communicative interface between the components of the security server 110, and between the security server and the other systems of the environment of FIG. 2. For instance, the interface can receive data to be tokenized from the local endpoint 105a, can provide the received data to the Unicode conversion engine 210 for conversion into Unicode code values, can route the code values to the pipeline engine 215 for tokenization, and can provide the tokenized data to the remote endpoint 105b. Likewise, the interface can request token tables from the token server 115, and can provide the requested token tables to the pipeline engine for use in tokenizing data. The interface can also generate one or more graphical user interfaces for use in tokenizing data, for instance for display to a user of the local endpoint prior to the local endpoint sending data to be tokenized to the security server, or to a user of the remote endpoint, for instance for displaying the tokenized data.

The Unicode conversion engine 210 converts characters of data to be tokenized (e.g., the received data from the local endpoint 105a) from a character domain associated with the data to be tokenized to Unicode code values. In some embodiments, the converted Unicode code values correspond to a particular Unicode standard. The Unicode standard can be a default Unicode standard, can be selected by the local endpoint or the remote endpoint 105b, can be based on the type of data being tokenized, or can be selected based on any other suitable factor. The resulting Unicode code values are provided to the pipeline engine 215 for use in producing tokenized data. The Unicode conversion engine can convert the tokenized data back to characters in a character domain. For instance, if the tokenized data includes a token value "0079", the Unicode conversion engine can convert the token value to the letter "y" (the character mapped to the Unicode code value "0079" in the UTF-8 standard).

The pipeline engine 215 instantiates one or more tokenization pipelines for use in the parallel tokenization of the data to be tokenized received from the local endpoint 105a.

Any number of tokenization pipelines may be generated such that a first value computed within a first pipeline is used to compute a second value within a second pipeline. Each tokenization pipeline includes a number of encoding operations performed in series, including at least one tokenization operation, and each tokenization pipeline performs the encoding operations of the tokenization pipeline in parallel. As used herein, encoding operations other than tokenization operations can be performed using processing engines, and tokenization operations can be performed using tokenization engines. Accordingly, by instantiating the tokenization pipeline, the pipeline engine can instantiate one or more processing engines and one or more tokenization engines within the tokenization pipeline.

The number of tokenization pipelines can be a default number of pipelines, or can be based on any suitable factor. For instance, the number of tokenization pipelines instantiated can be based on the requested tokenization, an entity associated with the local endpoint 105a, an entity associated with the remote endpoint 105b, a type or sensitivity of data to be tokenized, a set of characters associated with the data to be tokenized, a length or number of characters of the data to be tokenized, and the like. The encoding operations included in each tokenization operation can include any type of encoding operation and any number of each type of encoding operation. For instance, the encoding operations can include pre-processing operations, modulo addition operations, encryption operations, combinatorial operations (e.g., combining two or more data values mathematically, concatenating two or more data values, etc.), tokenization operations, and the like. The type and number of each encoding operation can be based on the tokenization request, the entity associated with the local endpoint or remote endpoint, a type or sensitivity of data to be tokenized, a set of characters associated with the data to be tokenized, and the like.

The pipeline engine 215, upon instantiating parallel tokenization pipelines, identifies, for each tokenization pipeline, values computed within the tokenization pipeline to provide to one or more additional pipelines for use in performing the encoding operations of the tokenization pipeline. Likewise, the pipeline engine identifies, for each tokenization pipeline, which values computed within other tokenization pipelines are provided to the tokenization pipeline for use in performing the encoding operations of the tokenization pipeline. For example, the pipeline engine can establish two tokenization pipelines, and can configure the tokenization pipelines such that the output of a tokenization engine of each pipeline is provided to a processing engine of the other pipeline to modify an input value before it is tokenized by a tokenization engine of the other pipeline. In some embodiments, token values from a first pipeline are used by a processing engine of a second pipeline to perform modulo addition on an input value or an output value of a token engine in the second pipeline. In some embodiments, token values from a first pipeline are used as encryption keys by a processing engine of a second pipeline to encrypt an input value or an output value of a token engine of the second pipeline.

In some embodiments, token values from a first pipeline are used by a processing engine of a second pipeline as initialization vectors to modify data values within the second pipeline. In some embodiments, the pipeline engine configures a value of a first pipeline to be provided to processing engines of multiple other pipelines to modify data in those other pipelines. Likewise, the pipeline engine can configure multiple pipelines to provide data values to a processing engine of a first pipeline, which is configured to use each of the multiple data values to modify a data value within the first data value. In yet other embodiments, the pipeline engine 215 can configure a value from a first tokenization pipeline to be used by a token engine of a second pipeline to select from between a set of token tables available to the token engine. For example, a token engine of a first tokenization pipeline can include or access a set of 100 token tables, and a value from a second tokenization pipeline can be used as an index to select among the 100 token tables for use in tokenizing data.

Each processing engine of a tokenization pipeline is configured to perform one or more associated encoding operations on one or more data values to produce a modified data value (or simply "modified value" hereinafter). If a processing engine requires more than one data value to perform the one or more encoding operations associated with the processing engine, the processing engine can wait until all data values are available before performing the one or more encoding operations. The processing engine can provide a modified value to another processing engine of the same tokenization pipeline or a different tokenization pipeline, or to a tokenization engine of the same tokenization pipeline or a different tokenization pipeline. Likewise, each tokenization engine of a tokenization pipeline is configured to perform one or more tokenization operations using one or more data values to produce a tokenized data value (or simply "token value" hereinafter). If a tokenization engine requires more than one data value to perform one or more tokenization operations, the tokenization engine can wait until all data values are available before performing the one or more tokenization operations. The tokenization engine can provide a token value to a processing engine or another tokenization engine of the same or a different tokenization pipeline.

As noted above, a processing engine or a tokenization engine may have to wait to receive all values required to perform encoding or tokenization operations associated with the processing engine or tokenization engine. In such embodiments, the performance of operations by a tokenization pipeline may pause while the performance of operations in other tokenization pipelines may continue. Each tokenization pipeline can be performed by a different hardware or software processor or processor core. By instantiating tokenization pipelines operating in parallel, the performance of the security server 110 is improved. Specifically, the data processing throughput of the security server is improved relative to a configuration of the security server that performs the encoding and tokenization operations described herein serially. Likewise, the allocation of hardware resources of the security server is improved by dedicating particular hardware resources (such as particular processing cores) to associated tokenization pipelines, decreasing the re-assignment of hardware resources to different encoding and tokenization operations that might otherwise be required if the encoding and tokenization operations were performed independently of the instantiated tokenization pipelines described herein. Finally, the processing capabilities of the security server configured to instantiate and execute tokenization pipelines in parallel are more efficient and take less time than would be required if the encoding and tokenization operations described herein are performed outside of the context of the parallel tokenization pipelines.

It should be noted that although the token tables, tokenization pipelines, tokenization engines, and processing engines are thus far described in the context of tokenizing Unicode data, such components can be instantiated and configured to tokenize other types of data according to the principles described above. For instance, parallel tokenization pipelines, each with one or more tokenization engines and processing engines, can be instantiated to tokenize date and time data, decimal data, and/or floating point data as described below.

Figure 4:
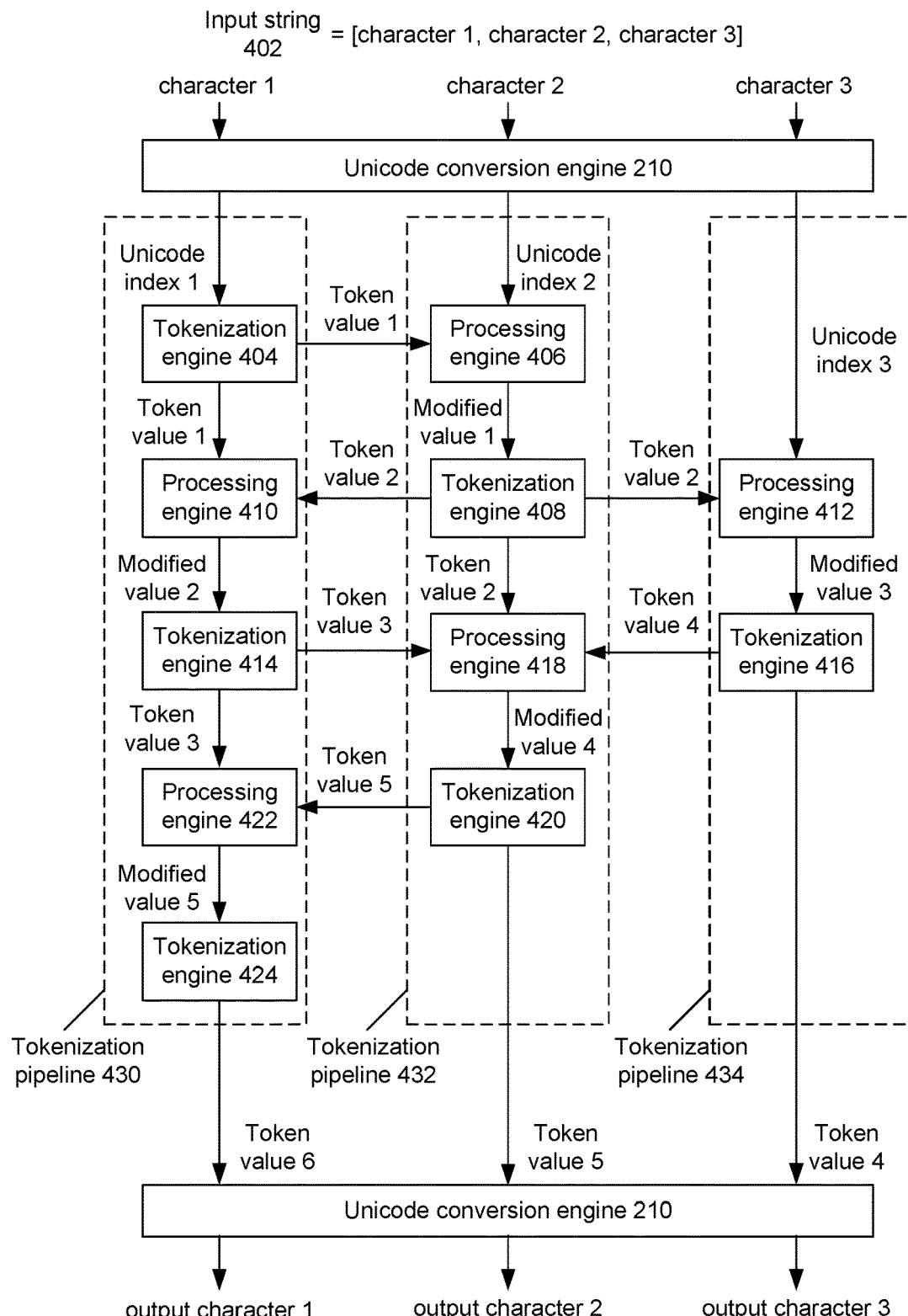
FIG. 4 illustrates an example Unicode tokenization operation in a parallel tokenization pipeline embodiment.

FIG. 4 illustrates an example Unicode tokenization operation in a parallel tokenization pipeline embodiment. In the embodiment of FIG. 4, three parallel tokenization pipelines are instantiated, a first tokenization pipeline 430, a second tokenization pipeline 432, and a third tokenization pipeline 434. Each of the three tokenization pipelines includes a number of tokenization engines and processing engines, each configured to perform encoding or tokenization operations based on data values generated within each tokenization pipeline and data values received from other tokenization pipelines. The configuration and number of tokenization pipelines in FIG. 4 is just one example of a parallel tokenization configuration, and is not limiting to other instantiations of tokenization pipelines or procedures that may be implemented according to the principles described herein.

In the embodiment of FIG. 4, an input string 402 (for instance, an input string received from the local endpoint 105a) to be tokenized includes three characters: character 1, character 2, and character 3. The characters are provided to the Unicode conversion engine 210, which converts their characters to the Unicode code value representations of these characters (e.g., Unicode index 1 is the Unicode code value corresponding to character 1, Unicode index 2 is the Unicode code value corresponding to character 2, and Unicode index 3 is the Unicode code value corresponding to character 3). Unicode index 1 is provided to the tokenization pipeline 430, Unicode index 2 is provided to the tokenization pipeline 432, and Unicode index 3 is provided to the tokenization pipeline 434.

Within the tokenization pipeline 430, the Unicode index 1 is provided to the tokenization engine 404, which tokenizes it to produce the token value 1. The token value 1 is provided to both the processing engine 406 of the tokenization pipeline 432 and to the processing engine 410 of the tokenization pipeline 430. The processing engine 406 performs an encoding operation (such as modulo addition) on the Unicode index 2 and the token value 1 to produce a modified value 1, which is provided to the tokenization engine 408 of the tokenization pipeline 432. The tokenization engine 408 tokenizes the modified value 1 to produce a token value 2, which is provided to the processing engine 410 of the tokenization pipeline 430, to the processing engine 412 of the tokenization pipeline 434, and to the processing engine 418 of the tokenization pipeline 432.

The processing engine 410 performs an encoding operation on the token value 1 and the token value 2, producing a modified value 2 which is provided to the tokenization engine 414 of the tokenization pipeline 430. In parallel with this encoding operation, the processing engine 412 performs an encoding operation on the Unicode index 3 and the token value 2 to produce a modified value 3, which is provided to the tokenization engine 416 of the tokenization pipeline 434. The tokenization engine 414 tokenizes the modified value 2 to produce a token value 3, which is provided to the processing engine 418 of the tokenization pipeline 432 and to the processing engine 422 of the tokenization pipeline 430. In parallel with this tokenization, the tokenization engine 416 tokenizes the modified value 3 to produce a token value 4, which is provided to the processing engine 418 of the tokenization pipeline 432, and which is also outputted from the tokenization pipeline 434.

The processing engine 418 performs an encoding operation on the token value 2, the token value 3, and the token value 4 to produce a modified value 4, which is provided to the tokenization 420 of the tokenization pipeline 432. The tokenization engine 420 tokenizes the modified value 4 to produce a token value 5, which is provided to the processing engine 422 of the tokenization pipeline 430, and which is also outputted from the tokenization pipeline 432. The processing engine 422 performs an encoding operation on the token value 3 and the token value 5 to produce a modified value 5, which is provided to the tokenization engine 424 of the tokenization pipeline 430. The tokenization engine 424 tokenizes the modified value 5 to produce a token value 6, which is outputted from the tokenization pipeline 430.

Token value 4, token value 5, and token value 6 are provided to the Unicode conversion engine 210, which outputs the output character 1, output character 2, and output character 3. For instance, output character 1 can be the character mapped to the Unicode code value represented by or equivalent to the token value 6, output character 2 can be the character mapped to the Unicode code value represented by or equivalent to the token value 5, and the output character 3 can be the character mapped to the Unicode code value represented by or equivalent to the token value 4. The output character 1, output character 2, and output character 3 collectively form the tokenized character string 440, which can be provided to the remote endpoint 105b.

In various embodiments, the processing engines within instantiated tokenization pipelines (such as the processing engines of FIG. 4) can perform the same or different encoding operations. Likewise, the tokenization engines within instantiated tokenization pipelines (such as the tokenization engines of FIG. 4) can perform the same or different tokenization operations, with the same or different token tables. For example, in some embodiments, all tokenization engines within instantiated tokenization pipelines use the same set of token tables; in some embodiments, all tokenization engines within the same tokenization pipeline use the same set of token tables, and each tokenization pipeline is associated with different sets of token tables; and in some embodiments, each tokenization engine uses a different set of token tables. Accordingly, the security server 110 can access a set of token tables from the token server 115 for all instantiated tokenization pipelines, can access a different set of token tables for each tokenization pipeline or each tokenization engine within each tokenization pipeline, or can access a set of token tables and can assign the accessed set of token tables to the tokenization pipelines and/or tokenization engines.

In some embodiments, such as the embodiment of FIG. 4, each tokenization pipeline can include different numbers of tokenization engines and processing engines, while in other embodiments, each tokenization pipeline can include the same number of tokenization engines and processing engines. In some embodiments, in order to satisfy a threshold level of security, the average number of tokenization engines and processing engines in each tokenization pipeline is inversely proportional to the number of tokenization pipelines instantiated. For example, for three instantiated tokenization pipelines, an average of 4 tokenization engines and processing engines may satisfy a threshold level of security, while for six instantiated tokenization pipelines, an average of 3 tokenization engines and processing engines may satisfy the threshold level of security. The threshold level of security, the average number of tokenization engines and processing engines within each tokenization pipeline, and the number of instantiated tokenization pipelines can be selected by a user or other entity corresponding to a system of FIG. 2, can be based on a type of data being tokenized, can be based on jurisdictional security requirement corresponding to a location of one or more of the systems of FIG. 2, or can be based on any other suitable criteria.

Figure 5:
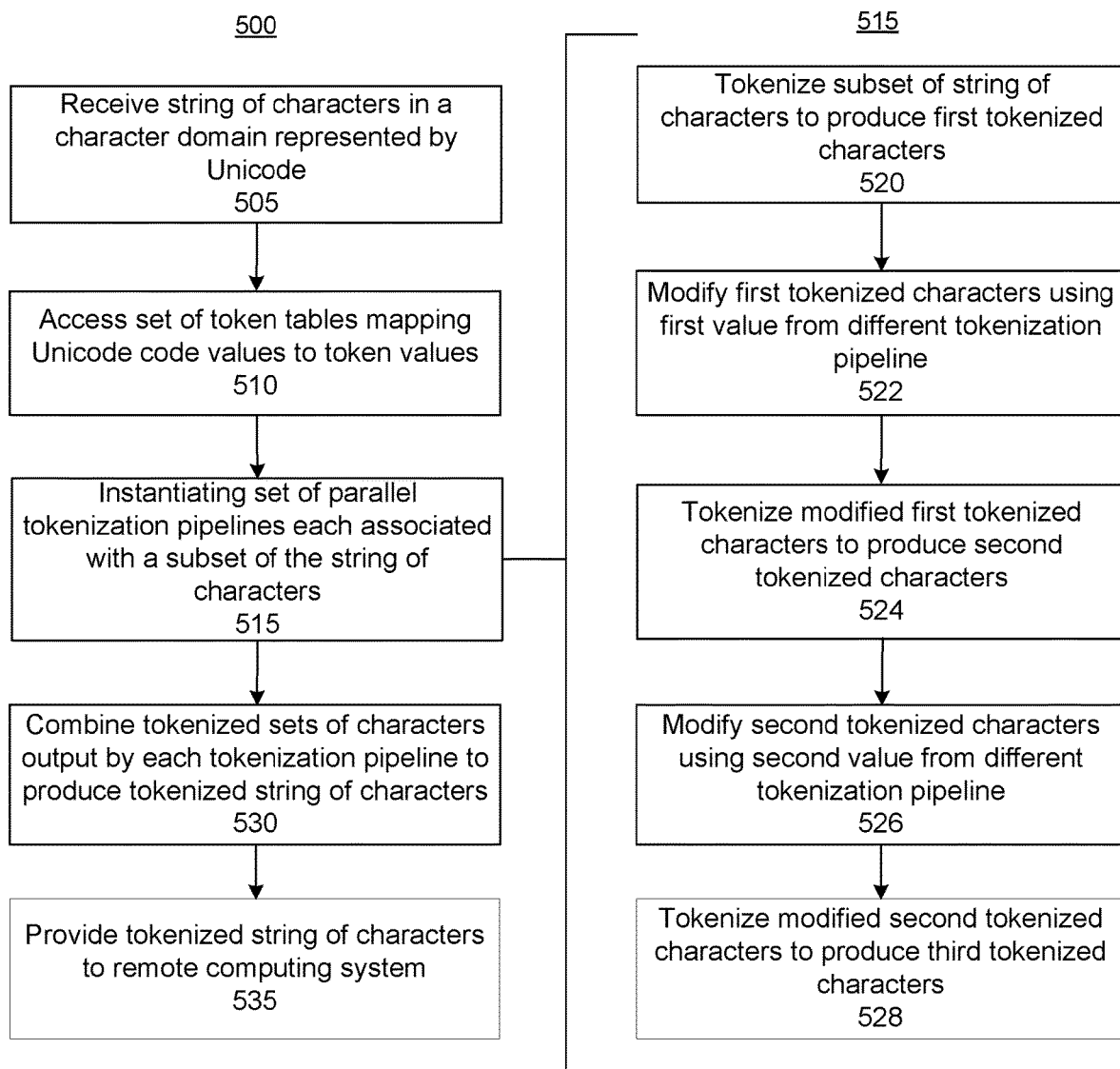
FIG. 5 is a flow chart illustrating a process for Unicode tokenization, according to one embodiment.

FIG. 5 is a flow chart illustrating a process of protecting Unicode data using parallel tokenization pipelines, according to one embodiment. It should be noted that the process illustrated in FIG. 5 is just one example of protecting Unicode data according to the principles described herein. In practice, other processes of protecting Unicode data can include additional, fewer, or different steps than illustrated in FIG. 5.

A string of characters in a character domain represented by Unicode is received 505 by a tokenization system (such as a central tokenization system, a security system, a server, a firewall system, and the like). A set of token tables mapping Unicode code values token values is accessed 510. Each token table maps a different token value to each of a set of Unicode code values. In some embodiments, the token tables are generated in advance of receiving the string of characters (and are stored, for instance, in a token table database or in a security system), while in other embodiments, the token tables are generated in response to receiving the data.

A set of parallel tokenization pipelines is instantiated 515, each tokenization pipeline configured to tokenize a different subset of the string of characters in parallel, simultaneously with, synchronously with, or in conjunction with one or more other tokenization pipelines. In one embodiment, a tokenization pipeline is configured to tokenize 520 a subset of the string of characters using a first token table of the accessed set of token tables to produce a first set of tokenized characters. For instance, Unicode code values corresponding to the subset of the string of characters are used to query the first token table, and token values mapped to the Unicode code values by the first token table are produced. The first set of tokenized characters include these produced token values.

The first set of tokenized characters are modified 522 using a first value from a different tokenization pipeline, such as a token value produced by a token table from the different tokenization pipeline. Modifying the first set of tokenized characters using the first value can include performing modulo addition on the first set of tokenized characters and the first value, combining the first set of tokenized characters and the first value, or any suitable mathematical or data operation on the first set of tokenized characters and the first value.

The modified first set of tokenized characters are tokenized 524 using a second token table of the accessed set of token tables to produce a second set of tokenized characters. The second set of tokenized characters are modified 526 using a second value from a different tokenization pipeline, and the modified second set of tokenized characters are tokenized 528 using a third token table of the accessed set of token tables to produce a third set of tokenized characters. The outputs of each tokenization pipeline are combined 530, for instance concatenated, to produce a tokenized string of characters. The tokenized string of characters can then be provided 535 to a remote computing system, for instance a receiving entity, a database, a security system, and the like.

Parallel Date and Time Tokenization in a Distributed Environment

Figure 6:
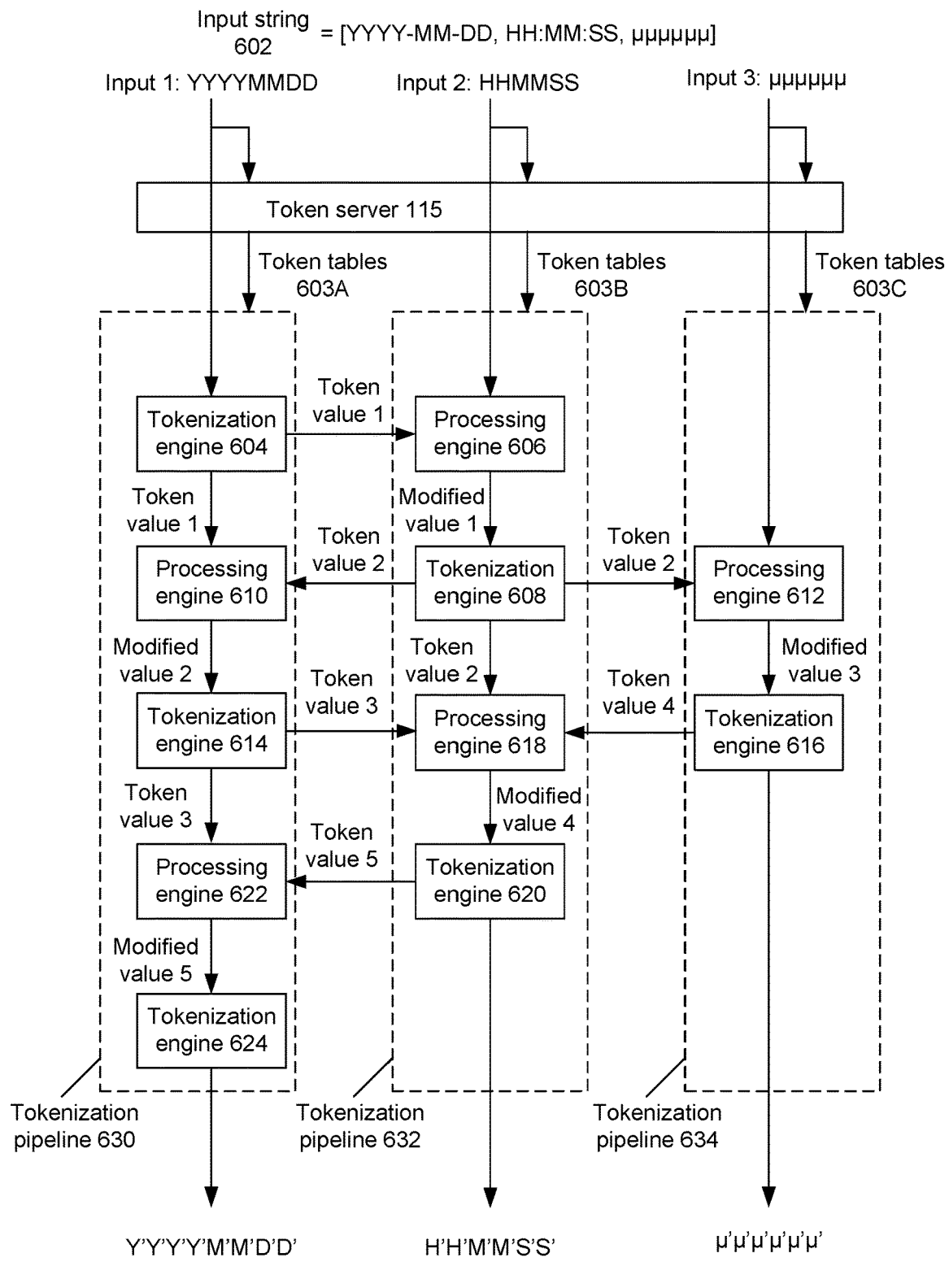
FIG. 6 illustrates an example date and time tokenization operation in a parallel tokenization pipeline embodiment.

In various embodiments, the local endpoint 105a provides or accesses date and time data for tokenization by the security server 110 (which may be located within or remote from the local endpoint). In response, the security server 110 instantiates one or more tokenization pipelines each configured to perform one or more tokenization operations on portions of the date and time data in parallel. FIG. 6 illustrates an example date and time tokenization operation in a parallel tokenization pipeline embodiment.

In the embodiment of FIG. 6, three parallel tokenization pipelines are instantiated, a first tokenization pipeline 630 (the "date tokenization pipeline"), a second tokenization pipeline 632 (the "time tokenization pipeline"), and a third tokenization pipeline 634 (the "microseconds tokenization pipeline"). Each of the three tokenization pipelines includes a number of tokenization engines and processing engines, each configured to perform encoding or tokenization operations based on data values generated within each tokenization pipeline and data values received from other tokenization pipelines. The configuration and number of tokenization pipelines in FIG. 6 is just one example of a parallel tokenization configuration, and is not limited to other instantiations of tokenization pipelines or procedures that may be implemented according to the principles described herein.

In the embodiment of FIG. 6, an input string 602 (for instance, an input string received from the local endpoint 105a) to be tokenized includes portions or sets of characters: a date portion, a time portion, and a microseconds portion. In the embodiment of FIG. 6, the date portion includes four characters representing a year ("YYYY" in FIG. 6), two characters representing a month ("MM" in FIG. 6), and two characters representing a day ("DD" in FIG. 6). Likewise, in the embodiment of FIG. 6, the time portion includes two characters representing an hour ("HH" in FIG. 6), two characters representing a minute ("MM" in FIG. 6), and two characters representing a second ("SS" in FIG. 6). Finally, in the embodiment of FIG. 6, the microseconds portion includes six characters representing a microsecond ("μμμμμμ" in FIG. 6). It should be noted that in practice, date information tokenized according to the principles described herein can be in any format, can include any number of characters, can include any number of portions, and can include portions in any order.

The portions of date information are provided to the token server 115, which provides a set of token tables corresponding to each portion of date information. In the embodiment of FIG. 6, the date portion (Input 1, or "YYYYMMDD") is provided to the token server 115, and the token server is configured to access or generate a first set of token tables 603A based on the value of the date portion. The first set of token tables 603A is provided to the first tokenization pipeline 630. Likewise, the time portion (Input 2, or "HHMMSS") is provided to the token server 115, and the token server is configured to access or generate a second set of token tables 603B based on the value of the time portion. The second set of token tables 603B is provided to the second tokenization pipeline 632. Finally, the microseconds portion (Input 3, or "μμμμμμ") is provided to the token server 115, and the token server is configured to access or generate a third set of token tables 603C based on the value of the microseconds portion. In some embodiments, there is no overlap in token tables between the sets of token tables 603A, 603B, and 603C, while in other embodiments, some or all token tables in a first of the sets of token tables 603A, 603B, and 603C are common between two or more of the sets of token tables. In some embodiments, one or more of the token tables within the sets of token tables 603A, 603B, and/or 603C are generated using all or part of the date portion, the time portion, and/or the microsecond portion as a seed. In some embodiments, one or more of the token tables within the sets of token tables 603A, 603B, and/or 603C are identified using all or part of the date portion, the time portion, and/or the microsecond portion as an index.

Within the tokenization pipeline 630, the input YYYYMMDD is provided to the tokenization engine 604, which tokenizes it to produce the token value 1. The token value 1 is provided to both the processing engine 606 of the tokenization pipeline 632 and to the processing engine 610 of the tokenization pipeline 630. The processing engine 606 performs an encoding operation (such as modulo addition) on the input HHMMSS and the token value 1 to produce a modified value 1, which is provided to the tokenization engine 608 of the tokenization pipeline 632. The tokenization engine 608 tokenizes the modified value 1 to produce a token value 2, which is provided to the processing engine 610 of the tokenization pipeline 630, to the processing engine 612 of the tokenization pipeline 634, and to the processing engine 618 of the tokenization pipeline 632.

The processing engine 610 performs an encoding operation on the token value 1 and the token value 2, producing a modified value 2 which is provided to the tokenization engine 614 of the tokenization pipeline 630. In parallel with this encoding operation, the processing engine 612 performs an encoding operation on the input μμμμμμ and the token value 2 to produce a modified value 3, which is provided to the tokenization engine 616 of the tokenization pipeline 634. The tokenization engine 614 tokenizes the modified value 2 to produce a token value 3, which is provided to the processing engine 618 of the tokenization pipeline 632 and to the processing engine 622 of the tokenization pipeline 630. In parallel with this tokenization, the tokenization engine 616 tokenizes the modified value 3 to produce a token value 4, which is provided to the processing engine 618 of the tokenization pipeline 632, and which is also outputted from the tokenization pipeline 634.

The processing engine 618 performs an encoding operation on the token value 2, the token value 3, and the token value 4 to produce a modified value 4, which is provided to the tokenization 620 of the tokenization pipeline 632. The tokenization engine 620 tokenizes the modified value 4 to produce a token value 5, which is provided to the processing engine 622 of the tokenization pipeline 630, and which is also outputted from the tokenization pipeline 632. The processing engine 622 performs an encoding operation on the token value 3 and the token value 5 to produce a modified value 5, which is provided to the tokenization engine 624 of the tokenization pipeline 630. The tokenization engine 624 tokenizes the modified value 5 to produce a token value 6, which is outputted from the tokenization pipeline 630.

The token value 6, token value 5, and token value 4 are outputted from the tokenization pipelines 630, 632, and 634, respectively. In particular, the token value 6 is outputted as the tokenized date value "Y'Y'Y'Y'M'M'D'D'", the token value 5 is outputted as the tokenized time value "H'H'M'M'S'S'", and the token value 4 is outputted as the tokenized microseconds value "μ'μ'μ'μ'μ'μ'". The tokenized date value, the tokenized time value, and the tokenized microseconds value collectively form the tokenized output 640, [Y'Y'Y'Y'M'M'D'D'-H'H'M'M'S'S'-μ'μ'μ'μ'μ'μ'], which can be provided to the remote endpoint 105b.

As noted above, the processing engines within instantiated tokenization pipelines of FIG. 6 can perform the same or different encoding operations. Likewise, the tokenization engines within instantiated tokenization pipelines of FIG. 6 can perform the same or different tokenization operations, with the same or different token tables. For example, in some embodiments, each tokenization engine within the tokenization pipeline 630 uses a different subset of token tables from the set of token tables 603A. Likewise, in some embodiments, each tokenization engine within the tokenization pipeline 630 uses the same subset of token tables within the set of token tables 603A. In some embodiments, operations within a tokenization pipeline are stalled or delayed until all outputs from other tokenization pipelines required to perform a tokenization or encoding operation are received.

As described above, in some embodiments, such as the embodiment of FIG. 6, each tokenization pipeline can include different numbers of tokenization engines and processing engines, while in other embodiments, each tokenization pipeline can include the same number of tokenization engines and processing engines. In some embodiments, in order to satisfy a threshold level of security, the average number of tokenization engines and processing engines in each tokenization pipeline is inversely proportional to the number of tokenization pipelines instantiated. The threshold level of security, the average number of tokenization engines and processing engines within each tokenization pipeline, and the number of instantiated tokenization pipelines can be selected by a user or other entity corresponding to a system of FIG. 2, can be based on a type of data being tokenized, can be based on jurisdictional security requirement corresponding to a location of one or more of the systems of FIG. 2, or can be based on any other suitable criteria.

In some embodiments, the date and time tokenization described herein can include a different number of tokenization pipelines. For instance, a distinct tokenization pipeline can be instantiated for one or more of: a year portion of characters (e.g., "YYYY"), a month portion of characters (e.g., "MM"), a day portion of characters (e.g., "DD"), an hour portion of characters (e.g., "HH"), a minute portion of characters (e.g., "MM"), a second portion of characters ("SS"), a subset of the microsecond portion of characters (e.g., the first three digits of μμμμμμ), or any combination thereof. In such embodiments, each tokenization pipeline includes one or more operations that require outputs of operations from or more additional tokenization pipelines.

In some embodiments, one or more portions of the input string 602 are left untokenized, and are included as-is within the tokenized output 640. For instance, in some embodiments, the year portion of characters (e.g., "YYYY") is left untokenized, such that the tokenized output 640 is [YYYYM'M'D'D'-H'H'M'M'S'S'-μ' μ' μ' μ' ]. In such embodiments, even though portions of the input string 602 are left untokenized, such portions can be used as inputs to one or more operations within a tokenization pipeline, as inputs to one or more preprocessing operations performed on other portions of the input string 602 prior to tokenization, or can be used to select token tables from the token server 115 for use by the tokenization pipelines in tokenizing other portions of the input string.

Figure 7:
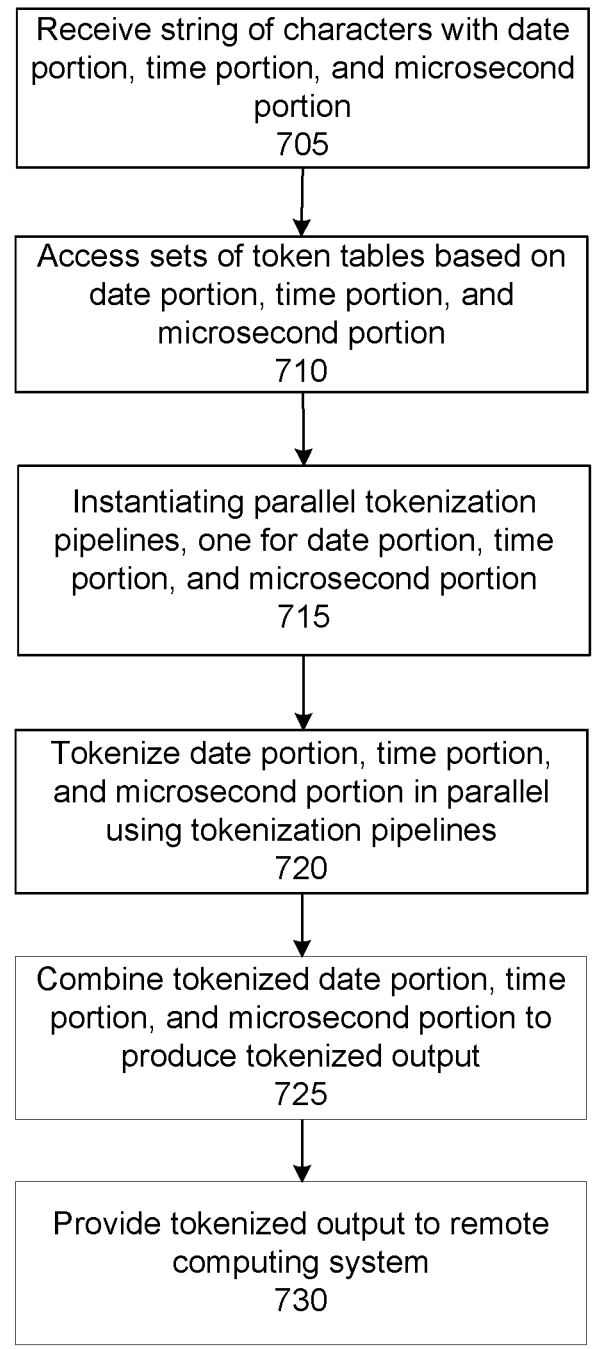
FIG. 7 is a flow chart illustrating a process for tokenizing date and time information, according to one embodiment.

FIG. 7 is a flow chart illustrating a process 700 for tokenizing date and time information, according to one embodiment. In the embodiment of FIG. 7, a string of characters is received 705, including a date portion, a time portion, and a microsecond portion. Sets of token tables are accessed 710 based on the date portion, the time portion, ad the microsecond portion. For instance, a first set of token tables with input value lengths equivalent to the length of the date portion are selected based on a value of the date portion, a second set of token tables with input value lengths equivalent to the length of the time portion are selected based on a value of the time portion, and a third set of token tables with input values equivalent to the length of the microseconds portion are selected based on a value of the microseconds portion.

A set of tokenization pipelines are instantiating 715 for operation in parallel. In some embodiments, the set of tokenization pipelines includes a first tokenization pipeline for the date portion of the string of characters, a second tokenization pipeline for the time portion of the string of characters, and a third tokenization pipeline for the microseconds portion of the string of characters. The date portion, time portion, and microsecond portions of the string of characters are tokenized 720 in parallel using the instantiated tokenization pipelines. The tokenized date portion, time portion, and microsecond portion are combined 725 to produce a tokenized output, and the tokenized output is provided 730 to a remote computing system.

Parallel Decimal Tokenization in a Distributed Environment

Figure 8:
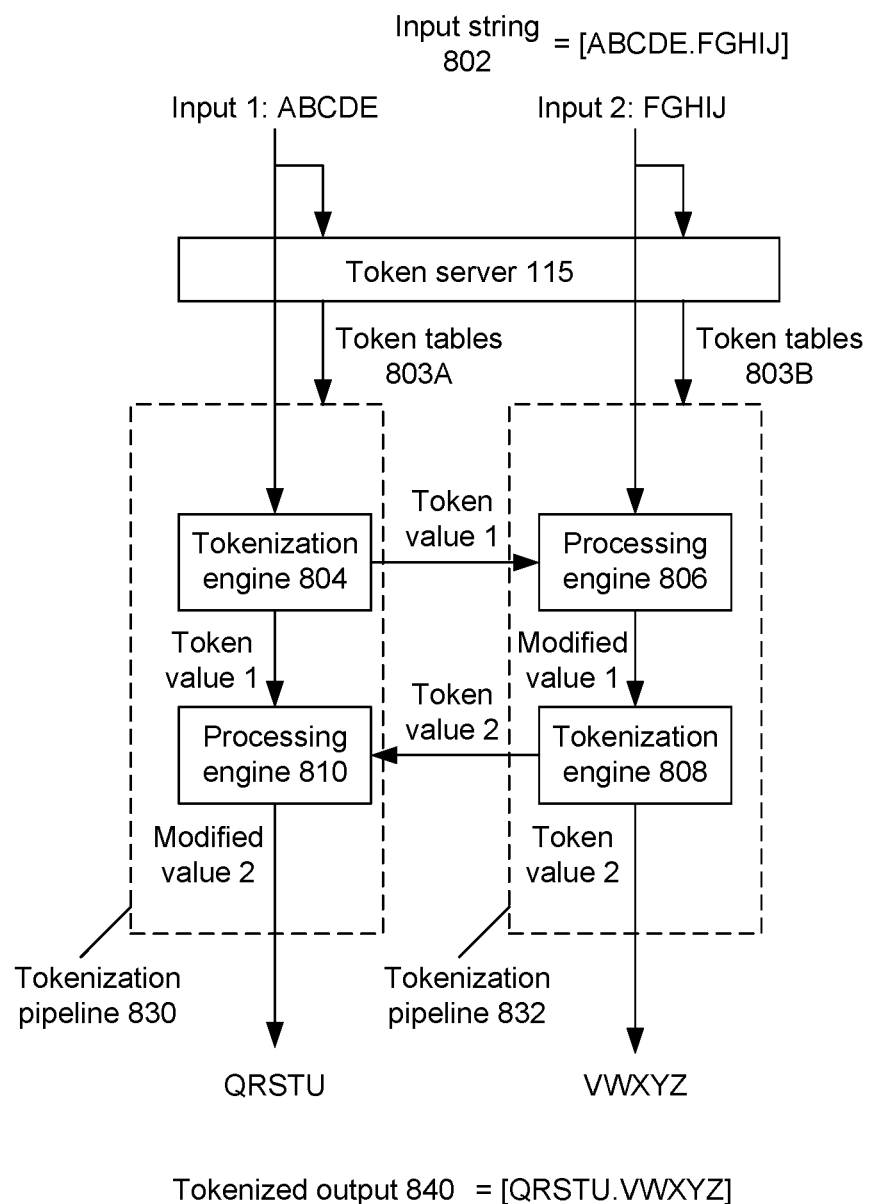
FIG. 8 illustrates an example decimal tokenization operation in a parallel tokenization pipeline embodiment.

In various embodiments, the local endpoint 105a provides or accesses decimal data for tokenization by the security server 110 (which may be located within or remote from the local endpoint). In response, the security server 110 instantiates one or more tokenization pipelines each configured to perform one or more tokenization operations on portions of the decimal data in parallel. FIG. 8 illustrates an example decimal tokenization operation in a parallel tokenization pipeline embodiment.

In the embodiment of FIG. 8, two parallel tokenization pipelines are instantiated, a first tokenization pipeline 830 (the "whole number tokenization pipeline") and a second tokenization pipeline 832 (the "decimal tokenization pipeline"). Each of these tokenization pipelines includes a number of tokenization engines and processing engines, each configured to perform encoding or tokenization operations based on data values generated within each tokenization pipeline and data values received from other tokenization pipelines. The configuration and number of tokenization pipelines in FIG. 8 is just one example of a parallel tokenization configuration, and is not limited to other instantiations of tokenization pipelines or procedures that may be implemented according to the principles described herein. For example, although each tokenization pipeline illustrated in FIG. 8 includes one tokenization engine and one processing engine, in practice, each tokenization engine can include two or more tokenization engines or processing engines configured to operate according to the principles described herein.

In the embodiment of FIG. 8, an input string 802 (for instance, an input string received from the local endpoint 105a) to be tokenized includes portions or sets of characters: a whole number portion and a decimal portion. In the embodiment of FIG. 8, the whole number portion includes five characters representing a whole number ("ABCDE" in FIG. 8) and five characters representing a portion of a whole number ("FGHIJ"). In other words, the portion "ABCDE" represents the portion of the decimal number to the left of the decimal, and the portion "FGHIJ" represents the portion of the decimal number to the right of the decimal. It should be noted that in practice, decimal information tokenized according the principles described herein can include whole number portions with any number of characters, and decimal portions within any number of characters. For example, the decimal numbers "ABCDEFG.H", "AB.CDEFGHI", and "0.00ABCD" can be tokenized using the parallel tokenization pipelines shown in FIG. 8.

The portions of decimal information are provided to the token server 115, which provides a set of token tables corresponding to each portion of decimal information. In the embodiment of FIG. 8, the whole number portion (Input 1, or "ABCDE") is provided to the token server 115, and the token server is configured to access or generate a first set of token tables 803A based on the value of the whole number portion. The first set of token tables 803A is provided to the first tokenization pipeline 830. Likewise, the decimal portion (Input 2, or "FGHIJ") is provided to the token server 115, and the token server is configured to access or generate a second set of token tables 803B based on the value of the decimal portion. The second set of token tables 803B is provided to the second tokenization pipeline 832. In some embodiments, there is no overlap in token tables between the sets of token tables 803A and 803B, while in other embodiments, some or all token tables are common between the sets of token tables 803A and 803B. In some embodiments, one or more of the token tables within the sets of token tables 803A or 803B are generated using all or part of the whole number portion and/or the decimal portion as a seed. In some embodiments, one or more of the token tables within the sets of token tables 803A or 803B are identified using all or part of the whole number portion and/or the decimal portion as an index.

Within the tokenization pipeline 830, the input ABCDE is provided to the tokenization engine 804, which tokenizes it to produce the token value 1. The token value 1 is provided to both the processing engine 806 of the tokenization pipeline 832 and to the processing engine 810 of the tokenization pipeline 830. The processing engine 806 performs an encoding operation (such as modulo addition) on the input FGHIJ and the token value 1 to produce a modified value 1, which is provided to the tokenization engine 808 of the tokenization pipeline 832. The tokenization engine 808 tokenizes the modified value 1 to produce a token value 2 ("VWXYZ" in the embodiment of FIG. 8), which is provided to the processing engine 810 of the tokenization pipeline 830, and which is outputted from the tokenization pipeline 832. The processing engine 810 performs an encoding operation on the token value 1 and the token value 2, producing a modified value 2 ("QRSTU" in the embodiment of FIG. 8), which is outputted from the tokenization pipeline 830.

After the modified value 2 and the token value 2 are outputted from the tokenization pipelines 830 and 832, respectively, the modified value 2 and the token value 2 are combined to produce a tokenized output 840. In the embodiment of FIG. 8, the tokenized output 840 is the value "QRSTU.VWXYZ". The tokenized output 840 can then be provided to the remote endpoint 105b.

As noted above, the processing engines within instantiated tokenization pipelines of FIG. 8 can perform the same or different encoding operations. Likewise, the tokenization engines within instantiated tokenization pipelines of FIG. 8 can perform the same or different tokenization operations, with the same or different token tables. For example, in some embodiments, each tokenization engine within the tokenization pipeline 830 uses a different subset of token tables from the set of token tables 803A. Likewise, in some embodiments, each tokenization engine within the tokenization pipeline 830 uses the same subset of token tables within the set of token tables 803A. In some embodiments, operations within a tokenization pipeline are stalled or delayed until all outputs from other tokenization pipelines required to perform a tokenization or encoding operation are received.

As described above, in some embodiments, each tokenization pipeline can include different numbers of tokenization engines and processing engines, while in other embodiments, each tokenization pipeline can include the same number of tokenization engines and processing engines. In some embodiments, in order to satisfy a threshold level of security, the average number of tokenization engines and processing engines in each tokenization pipeline is inversely proportional to the number of tokenization pipelines instantiated. The threshold level of security, the average number of tokenization engines and processing engines within each tokenization pipeline, and the number of instantiated tokenization pipelines can be selected by a user or other entity corresponding to a system of FIG. 2, can be based on a type of data being tokenized, can be based on jurisdictional security requirement corresponding to a location of one or more of the systems of FIG. 2, or can be based on any other suitable criteria.

In some embodiments, the decimal tokenization described herein can include a different number of tokenization pipelines. For instance, a distinct tokenization pipeline can be instantiated for every one character, two characters, three characters, four characters, more than four characters, or any combination thereof of the whole number portion and/or the decimal portion. Using the input value "ABCDE.FGHIJ", a first tokenization pipeline can be instantiated to tokenize the characters "AB", a second tokenization pipeline can be instantiated to tokenize the characters "CDE", a third tokenization pipeline can be instantiated to tokenize the character "F", and a fourth tokenization pipeline can be instantiated to tokenize the characters "GHIJ". In such embodiments, each tokenization pipeline includes one or more operations that require outputs of operations from or more additional tokenization pipelines.

In some embodiments, one or more portions of the input string 802 are left untokenized, and are included as-is within the tokenized output 840. For instance, in some embodiments, the first two characters (e.g., "AB") are left untokenized, such that the tokenized output 840 is "ABSTU.VWXYZ". In such embodiments, even though portions of the input string 802 are left untokenized, such portions can be used as inputs to one or more operations within a tokenization pipeline, as inputs to one or more preprocessing operations performed on other portions of the input string 802 prior to tokenization, or can be used to select token tables from the token server 115 for use by the tokenization pipelines in tokenizing other portions of the input string. In some embodiments, the format of the output string 840 is different from the format of the input string 802. For instance, the decimal within the output string 840 can be located in a different place than the decimal within the input string 802. For example, the tokenized output 840 can be "QRS.TUVWXYZ".

Figure 9:
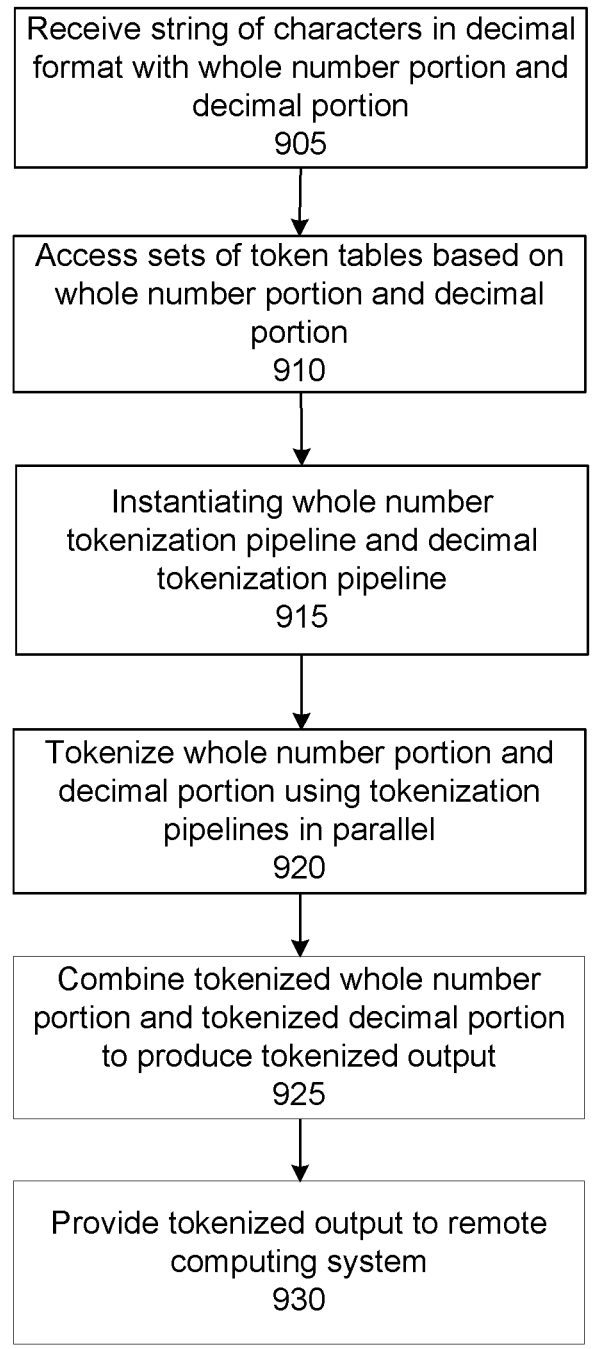
FIG. 9 is a flow chart illustrating a process for tokenizing decimal information, according to one embodiment.

FIG. 9 is a flow chart illustrating a process 900 for tokenizing decimal information, according to one embodiment. A string of characters in decimal formation is received 905. The string of characters can include a whole number portion of characters (e.g., the characters that occur before a decimal point within the string of characters) and a decimal portion of characters (e.g., the characters that occur after the decimal point within the string of characters). Sets of token tables are accessed 910 based on the whole number portion and the decimal portion. For instance, a first set of token tables is identified and provided based on a value of the whole number portion of characters, and a second set of token tables is identified and provided based on a value of the decimal portion of characters.

One or more tokenization pipelines are instantiated 915, including a whole number tokenization pipeline and a decimal tokenization pipeline. The whole number portion and the decimal portion are tokenized 920 using the tokenization pipelines in parallel. For instance, the whole number tokenization pipeline tokenizes the whole number portion of characters in parallel with the decimal tokenization pipeline tokenizing the decimal portion of characters. The tokenized whole number portion and the tokenized decimal portion are combined 925 to produce a tokenized output, and the tokenized output is provided 930 to a remote computing system.

Parallel Floating Point Tokenization in a Distributed Environment

Figure 10:
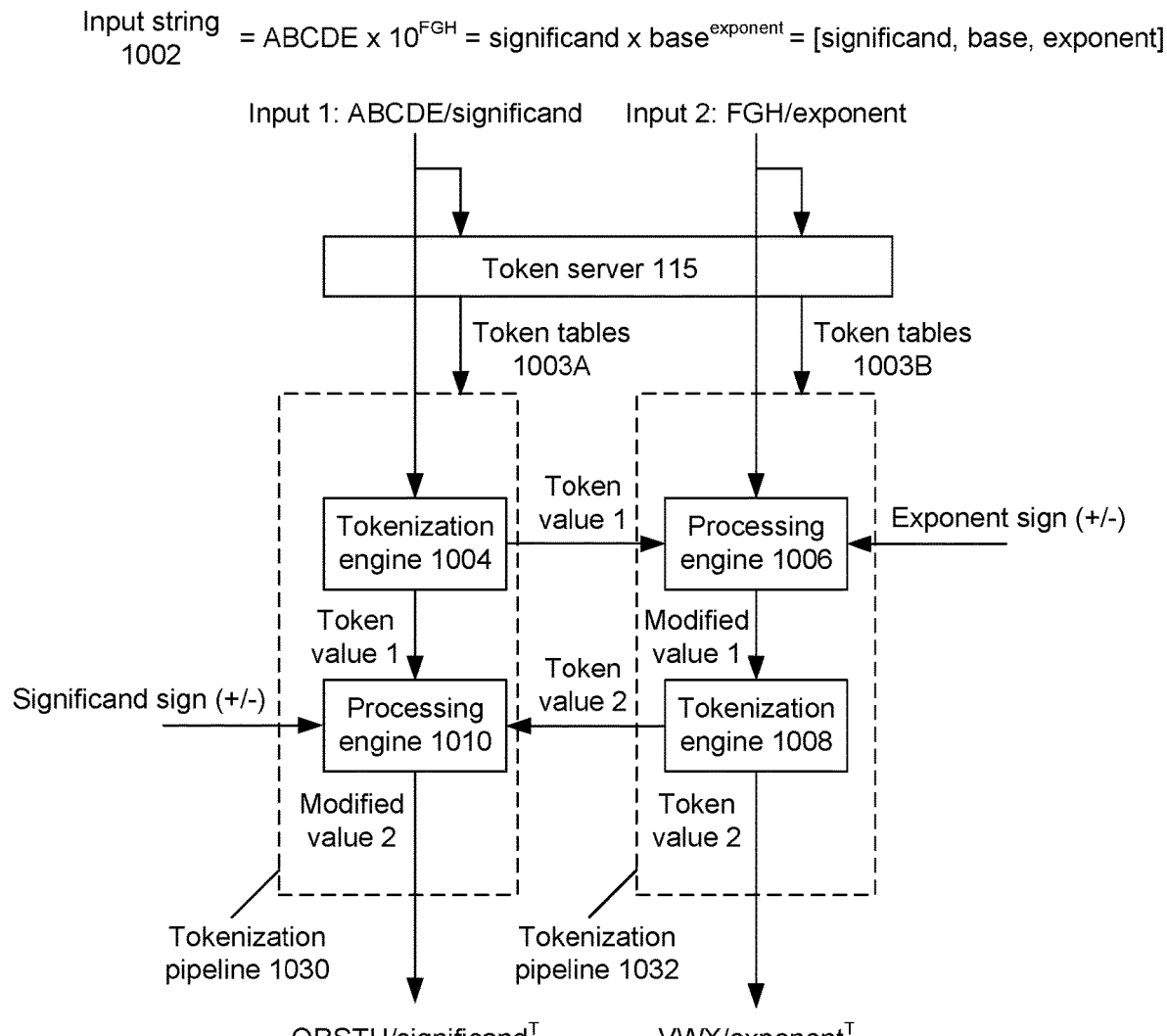
FIG. 10 illustrates an example floating point tokenization operation in a parallel tokenization pipeline embodiment.

In various embodiments, the local endpoint 105a provides or accesses floating point data for tokenization by the security server 110 (which may be located within or remote from the local endpoint). In response, the security server 110 instantiates one or more tokenization pipelines each configured to perform one or more tokenization operations on portions of the floating point data in parallel. FIG. 10 illustrates an example floating point tokenization operation in a parallel tokenization pipeline embodiment.

In the embodiment of FIG. 10, two parallel tokenization pipelines are instantiated, a first tokenization pipeline 1030 (the "significand tokenization pipeline") and a second tokenization pipeline 1032 (the "exponent tokenization pipeline"). Each of these tokenization pipelines includes a number of tokenization engines and processing engines, each configured to perform encoding or tokenization operations based on data values generated within each tokenization pipeline and data values received from other tokenization pipelines. The configuration and number of tokenization pipelines in FIG. 10 is just one example of a parallel tokenization configuration, and is not limited to other instantiations of tokenization pipelines or procedures that may be implemented according to the principles described herein. For example, although each tokenization pipeline illustrated in FIG. 10 includes one tokenization engine and one processing engine, in practice, each tokenization engine can include two or more tokenization engines or processing engines configured to operate according to the principles described herein.

In the embodiment of FIG. 10, an input string 1002 (for instance, an input string received from the local endpoint 105a) to be tokenized includes portions or sets of characters: a significand portion, a base portion, and an exponent portion. In the embodiment of FIG. 10, the significand portion includes five characters representing a significand of the floating point number ("ABCDE" in FIG. 10), two characters representing a base of the floating number ("10"), and three characters representing an exponent of the floating point number ("FGH"). In other words, the floating point number is "ABCDE×$10^{FGH}$". It should be noted that in practice, floating point information tokenized according the principles described herein can include significands, bases, and exponents with any number of characters. Likewise, the significand and the exponent can be either positive or negative.

The significand portion and the exponent portion of the floating point information are provided to the token server 115, which provides a set of token tables corresponding to each portion. In the embodiment of FIG. 10, the significand portion (Input 1, or "ABCDE") is provided to the token server 115, and the token server is configured to access or generate a first set of token tables 1003A based on the value of the significand portion. The first set of token tables 1003A is provided to the first tokenization pipeline 1030. Likewise, the exponent portion (Input 2, or "FGH") is provided to the token server 115, and the token server is configured to access or generate a second set of token tables 1003B based on the value of the exponent portion. The second set of token tables 1003B is provided to the second tokenization pipeline 1032. In some embodiments, there is no overlap in token tables between the sets of token tables 1003A and 1003B, while in other embodiments, some or all token tables are common between the sets of token tables 1003A and 1003B. In some embodiments, one or more of the token tables within the sets of token tables 1003A or 1003B are generated using all or part of the significand portion, the base portion, and/or the exponent portion as a seed. In some embodiments, one or more of the token tables within the sets of token tables 1003A or 1003B are identified using all or part of the significand portion, the base portion, and/or the exponent portion as an index.

Within the tokenization pipeline 1030, the input ABCDE is provided to the tokenization engine 1004, which tokenizes it to produce the token value 1. The token value 1 is provided to both the processing engine 1006 of the tokenization pipeline 1032 and to the processing engine 1010 of the tokenization pipeline 1030. The processing engine 1006 performs an encoding operation (such as modulo addition) on the input FGH, the token value 1, and the sign (+ or −) of the exponent portion to produce a modified value 1, which is provided to the tokenization engine 1008 of the tokenization pipeline 1032. The tokenization engine 1008 tokenizes the modified value 1 to produce a token value 2 ("VWX" in the embodiment of FIG. 10), which is provided to the processing engine 1010 of the tokenization pipeline 1030, and which is outputted from the tokenization pipeline 1032. The processing engine 1010 performs an encoding operation on the token value 1, the token value 2, and the sign (+ or −) of the significand portion to produce a modified value 2 ("QRSTU" in the embodiment of FIG. 10), which is outputted from the tokenization pipeline 1030.

After the modified value 2 and the token value 2 are outputted from the tokenization pipelines 1030 and 1032, respectively, the modified value 2 and the token value 2 are combined to produce a tokenized output 1040. In the embodiment of FIG. 10, the tokenized output 1040 is the value "QRSTU×10$^{VWX}$" or [QRSTU, 10, VWX]. The tokenized output 1040 can then be provided to the remote endpoint 105b.

As noted above, the processing engines within instantiated tokenization pipelines of FIG. 10 can perform the same or different encoding operations. Likewise, the tokenization engines within instantiated tokenization pipelines of FIG. 10 can perform the same or different tokenization operations, with the same or different token tables. For example, in some embodiments, each tokenization engine within the tokenization pipeline 1030 uses a different subset of token tables from the set of token tables 1003A. Likewise, in some embodiments, each tokenization engine within the tokenization pipeline 1030 uses the same subset of token tables within the set of token tables 1003A. In some embodiments, operations within a tokenization pipeline are stalled or delayed until all outputs from other tokenization pipelines required to perform a tokenization or encoding operation are received.

As described above, in some embodiments, each tokenization pipeline can include different numbers of tokenization engines and processing engines, while in other embodiments, each tokenization pipeline can include the same number of tokenization engines and processing engines. In some embodiments, in order to satisfy a threshold level of security, the average number of tokenization engines and processing engines in each tokenization pipeline is inversely proportional to the number of tokenization pipelines instantiated. The threshold level of security, the average number of tokenization engines and processing engines within each tokenization pipeline, and the number of instantiated tokenization pipelines can be selected by a user or other entity corresponding to a system of FIG. 2, can be based on a type of data being tokenized, can be based on jurisdictional security requirement corresponding to a location of one or more of the systems of FIG. 2, or can be based on any other suitable criteria.

In some embodiments, the floating point tokenization described herein can include a different number of tokenization pipelines. For instance, a distinct tokenization pipeline can be instantiated for sub-portions of the significand portion and/or for sub-portions of the exponent portion. In some embodiments, an additional tokenization pipeline is instantiated for the base portion of the floating point information. In such embodiments, the tokenized base portion (for example, "JKL") can be included within the tokenized output 1040, for instance, such that the tokenized output is "ABCDE×JKL$^{VWX}$". In such embodiments, each tokenization pipeline includes one or more operations that require outputs of operations from or more additional tokenization pipelines.

In some embodiments, one or more portions of the input string 1002 are left untokenized, and are included as-is within the tokenized output 1040. For instance, in some embodiments, the first two characters (e.g., "AB") are left untokenized, such that the tokenized output 1040 is "ABSTU×10$^{VWX}$". In such embodiments, even though portions of the input string 1002 are left untokenized, such portions can be used as inputs to one or more operations within a tokenization pipeline, as inputs to one or more preprocessing operations performed on other portions of the input string 1002 prior to tokenization, or can be used to select token tables from the token server 115 for use by the tokenization pipelines in tokenizing other portions of the input string. In some embodiments, the format of the output string 1040 is different from the format of the input string 1002. For instance, the base portion within the output string 1040 can be located in a different place than the base portion within the input string 1002. For example, the tokenized output 1040 can be "[10, ABCDE, VWX]".

Figure 11:
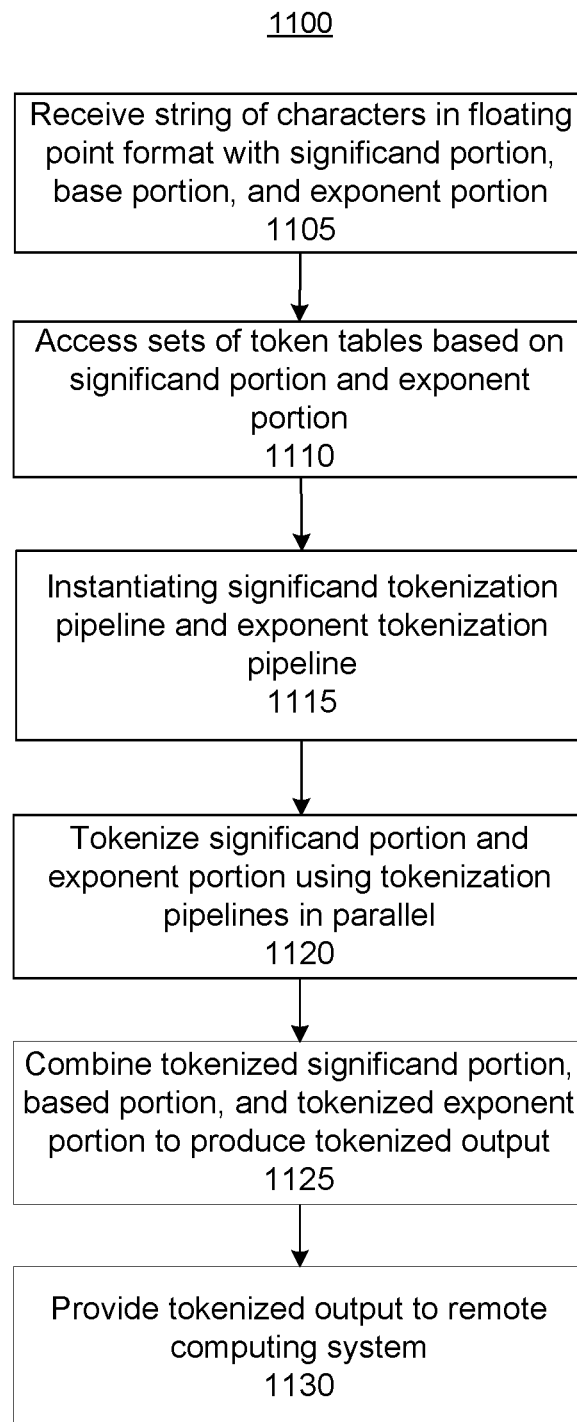
FIG. 11 is a flow chart illustrating a process for tokenizing floating point information, according to one embodiment.

FIG. 11 is a flow chart illustrating a process 1100 for tokenizing floating point information, according to one embodiment. A string of characters in a floating point format is received 1105. The string of characters includes a significand portion, a base portion, and an exponent portion such that a number represented by the floating point information is equivalent to a value of the base portion to the power a value of the exponent portion, multiplied by a value of the significand portion. One or more sets of token tables are accessed 1110 based on the significand portion and the exponent portion. For instance, a first set of token tables are accessed based on a value of the significand portion and a second set of token tables are accessed based on a value of the exponent portion.

A set of tokenization pipelines are instantiated 1115, including a significand tokenization pipeline and an exponent tokenization pipeline. The significand portion is tokenized 1120 using the significand tokenization pipeline, and the exponent portion is tokenized using the exponent tokenization pipeline. The tokenized significand portion, the base portion, and the tokenized exponent portion are combined 1125 to produce a tokenized output, and the tokenized output is provided 1130 to a remote computing system.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at a local computing system, a string of characters in a decimal format, the string of characters comprising a whole number portion and a decimal portion;
   querying, by the local computing system, a token server using the whole number portion to access a first set of token tables and using the decimal portion to access a second set of token tables;
   instantiating, by the local computing system, a whole number tokenization pipeline and a decimal tokenization pipeline, the whole number tokenization pipeline configured to perform one or more sequential tokenization operations on the whole number portion using the first set of token tables to produce a tokenized whole number set of characters in parallel with the decimal tokenization pipeline configured to perform one or more sequential tokenization operations on the decimal portion using the second set of token tables to produce a tokenized decimal set of characters, wherein a first tokenization operation for the decimal tokenization pipeline is based on an output of a second tokenization operation from the whole number tokenization pipeline; and
   combining the tokenized whole number set of characters and the tokenized decimal set of characters to produce a tokenized decimal output and providing, by the local computing system, the tokenized decimal output to a remote computing system.

2. The method of claim 1, wherein the decimal tokenization pipeline is configured to delay the performance of the first tokenization operation until the whole number tokenization pipeline completes the performance of the second tokenization operation.

3. The method of claim 1, wherein the whole number portion comprises a first set of characters, and wherein the decimal portion comprises a second set of characters.

4. The method of claim 3, where the first set of token tables each map input values of a length equal to a length of the first set of characters to different token values.

5. The method of claim 4, where the second set of token tables each map input values of a length equal to a length of the second set of characters to different token values.

6. The method of claim 3, wherein a length of the first set of characters is different from a length of the second set of characters.

7. The method of claim 1, wherein the token server is located remotely from the local computing system and the remote computing system.

8. A non-transitory computer-readable storage medium storing executable instructions that, when executed by a hardware processor, cause the hardware processor to perform steps comprising:
   receiving, at a local computing system, a string of characters in a decimal format, the string of characters comprising a whole number portion and a decimal portion;
   querying, by the local computing system, a token server using the whole number portion to access a first set of token tables and using the decimal portion to access a second set of token tables;
   instantiating, by the local computing system, a whole number tokenization pipeline and a decimal tokenization pipeline, the whole number tokenization pipeline configured to perform one or more sequential tokenization operations on the whole number portion using the first set of token tables to produce a tokenized whole number set of characters in parallel with the decimal tokenization pipeline configured to perform one or more sequential tokenization operations on the decimal portion using the second set of token tables to produce a tokenized decimal set of characters, wherein a first tokenization operation for the decimal tokenization pipeline is based on an output of a second tokenization operation from the whole number tokenization pipeline; and combining the tokenized whole number set of characters and the tokenized decimal set of characters to produce a tokenized decimal output and providing, by the local computing system, the tokenized decimal output to a remote computing system.

9. The non-transitory computer-readable storage medium of claim 8, wherein the decimal tokenization pipeline is configured to delay the performance of the first tokenization operation until the whole number tokenization pipeline completes the performance of the second tokenization operation.

10. The non-transitory computer-readable storage medium of claim 8, wherein the whole number portion comprises a first set of characters, and wherein the decimal portion comprises a second set of characters.

11. The non-transitory computer-readable storage medium of claim 10, where the first set of token tables each map input values of a length equal to a length of the first set of characters to different token values.

12. The non-transitory computer-readable storage medium of claim 11, where the second set of token tables each map input values of a length equal to a length of the second set of characters to different token values.

13. The non-transitory computer-readable storage medium of claim 10, wherein a length of the first set of characters is different from a length of the second set of characters.

14. The non-transitory computer-readable storage medium of claim 8, wherein the token server is located remotely from the local computing system and the remote computing system.

15. A system comprising:
a hardware processor; and
a non-transitory computer-readable storage medium storing executable instructions that, when executed by the hardware processor, cause the hardware processor to perform steps comprising:
receiving, at a local computing system, a string of characters in a decimal format, the string of characters comprising a whole number portion and a decimal portion;

querying, by the local computing system, a token server using the whole number portion to access a first set of token tables and using the decimal portion to access a second set of token tables;

instantiating, by the local computing system, a whole number tokenization pipeline and a decimal tokenization pipeline, the whole number tokenization pipeline configured to perform one or more sequential tokenization operations on the whole number portion using the first set of token tables to produce a tokenized whole number set of characters in parallel with the decimal tokenization pipeline configured to perform one or more sequential tokenization operations on the decimal portion using the second set of token tables to produce a tokenized decimal set of characters, wherein a first tokenization operation for the decimal tokenization pipeline is based on an output of a second tokenization operation from the whole number tokenization pipeline; and combining the tokenized whole number set of characters and the tokenized decimal set of characters to produce a tokenized decimal output and providing, by the local computing system, the tokenized decimal output to a remote computing system.

16. The system of claim 15, wherein the decimal tokenization pipeline is configured to delay the performance of the first tokenization operation until the whole number tokenization pipeline completes the performance of the second tokenization operation.

17. The system of claim 15, wherein the whole number portion comprises a first set of characters, and wherein the decimal portion comprises a second set of characters.

18. The system of claim 17, where the first set of token tables each map input values of a length equal to a length of the first set of characters to different token values.

19. The system of claim 18, where the second set of token tables each map input values of a length equal to a length of the second set of characters to different token values.

20. The system of claim 17, wherein a length of the first set of characters is different from a length of the second set of characters.

* * * * *